United States Patent [19]

Neustein

[11] Patent Number: 5,192,947
[45] Date of Patent: Mar. 9, 1993

[54] CREDIT CARD PAGER APPARATUS

[76] Inventor: Simon Neustein, 415 East 64th St.-Apt. 1C, New York, N.Y. 10021

[21] Appl. No.: 473,885

[22] Filed: Feb. 2, 1990

[51] Int. Cl.$^5$ .................................................. H04Q 7/00
[52] U.S. Cl. ............................... 340/825.44; 235/380; 379/57; 341/22; 340/825.33; 340/311.1
[58] Field of Search ............. 340/825.44, 825.47, 340/311.1, 825.33, 825.34; 379/91, 57; 455/344, 347; 235/380, 382, 382.5; 341/22

[56] References Cited

U.S. PATENT DOCUMENTS

| | | | |
|---|---|---|---|
| 4,517,660 | 5/1985 | Fushimoto et al. | 341/22 |
| 4,680,785 | 7/1987 | Akiyama et al. | 379/57 |
| 4,818,987 | 4/1989 | Ide et al. | 340/825.44 |
| 4,870,419 | 9/1989 | Baldwin et al. | 340/825.54 |
| 4,877,947 | 10/1989 | Mori | 340/825.34 |
| 4,935,745 | 6/1990 | Mori et al. | 455/89 |

Primary Examiner—Donald J. Yusko
Assistant Examiner—Peter Weissman
Attorney, Agent, or Firm—Helfgott & Karas

[57] ABSTRACT

A low cost, low power consumption pager of approximate credit card size which can serve as both a pager and a credit card or telephone calling card. The pager is powered by a flat, flexible battery, and is comprised of low power consumption pager circuitry. The circuit is turned on and off at regular intervals to converse energy. The pager holder is altered to incoming messages by a combination of audio and visual signals. The pager can be activated or deactivated by itself or in concert with other pager devices by a single cell. The pager includes a magnetic strip, or the like, for encoding identification and security data and for performing account verification. The audio circuit on the pager can emit audio signals of varying pitch and amplitude, each combination representing a distinct class of messages. Each pager can emit a unique sound distinguishing that pager from all others in a group. The circuit responds to signals for overriding the reception of messages and for turning off the audio cirucit, if circumstances warrant it.

33 Claims, 5 Drawing Sheets

CREDIT CARD PAGER APPARATUS

FIELD OF THE INVENTION

This invention relates to a low cost, low power consumption pager apparatus which includes intelligence capabilities. The pager can be formed in sufficiently small size to be also used as a credit card and can then include account identification means on the apparatus.

BACKGROUND OF THE INVENTION

Pagers are well known in the art. Such pagers generally include receiving circuitry to receive a signal from a remote transmitting station and respond with an audio or visual indication to page the pager holder, hereinafter referred to as the called party. To satisfy the paging function, pagers differ from telephone equipment in that pagers do not include transmission capabilities, but only receiver capabilities. Hereinafter, reference to a pager or pager apparatus means such type of apparatus which can only receive remotely transmitted signals and alert the called party but do not have the capability for transmission of responses. Thus, they cannot support real time, two-way communication.

In addition to the receiving circuitry and display means, pagers have been known to include microprocessors for storing information received by the pager. By way of example, U.S. Pat. No. 4,696,054, issued to S. Tsugei et al., provides for a wireless device, preferably, pocketable, capable of receiving a message serial number, a display for displaying the message serial number and transmission means for transmitting a response since a receiver cannot inform the operator of the meaning of the message being transmitted. It is evident from the aforementioned description, that the messages received or transmitted can only be very brief. Moreover, no provisions exist to process incoming paging data.

U.S. Pat. No. 4,766,434 issued to M. Matai et al., and assigned to NEC Corporation, describes an improved receiver whereby the contents of the messages to be displayed are controlled on the basis of control data. It enables a user to grasp the information in long messages without scrolling through their entire contents. It also provides for a display having a "summary display function" which indicates the contents of received messages by either a partial message or a message type display.

While such pagers make use of microprocessors, the use of the microprocessor in a pager has been for very limited functions, and thus far no intelligence functions have been available on pagers. Additionally, the pagers have typically utilized bulky batteries which has resulted in large sized units. Accordingly, while paging devices are readily available, advancement in their technology and expansion of their functions and capabilities has been limited so that pagers are still generally utilized only by select portions of the general population and have been limited to commercial or emergency type usage.

SUMMARY OF THE INVENTION

Accordingly, it is an object of the present invention to provide a pager apparatus which includes intelligence capabilities to enhance the functional aspects of the pager apparatus.

Yet another object of the present invention is to provide a pager apparatus which can respond to multiple telephone numbers or multiple identification codes.

Still another object of the present invention is to provide a pager apparatus which has the capabilities of processing incoming messages and selectively responding to them in accordance with a predetermined response for each of various types of messages.

It is yet a further object of the present invention to provide a pager apparatus which can function on low power requirements thereby maintaining its operability for relatively long periods of time between battery recharge or replacement.

Still a further object of the present invention is to provide a pager apparatus of a reduced size to permit its use simultaneously as a calling card, a telephone card, a credit card, account identification card, or the like.

Another object of the present invention is to provide a pager apparatus which can include account identification information thereby permitting the pager apparatus to be used as a credit card, a calling card, a telephone card, or the like.

A further object of the present invention is to provide an improved pager apparatus which can be ubiquitously carried by a large segment of the population and still avoids becoming a nuisance to the public.

Still another object of the present invention is to provide a low cost, long life, pager apparatus which permits disposability of the apparatus.

Yet a further object of the present invention is to provide a pager apparatus having audio and visual responses which can be controlled or have the controls overridden both manually and remotely.

A further object of the present invention is to provide a pager apparatus which can provide an audio indication to the called party which is different than substantially every other pager within a unified paging system.

Still another object of the present invention is to provide a pager apparatus which can provide a plurality of different responses, both audio and visual, based upon the type of incoming message.

Another object of the present invention is to provide a pager apparatus having a synchronized time clock arrangement with a transmitter to control the operation of the pager between an active and a standby condition, in order to preserve power.

The aforementioned and other objects, and features of the invention are brought about in accordance with the present invention, wherein there is provided a pager apparatus including analog and digital circuitry arranged so that the pager effectively provides intelligence functions. The digital circuitry includes a microprocessor or the equivalent thereof which can respond to multiple assigned telephone numbers or identification numbers so that the called party can be called through multiple numbers. It also provides storage of message information and is arranged to respond in a prescribed manner for selected types of calls, such as emergency calls, and the like. It also stores information and can compare an incoming message with a stored message to determine whether it is a new or repeated message. The microprocessor is also available to provide other functions both as an intelligent pager apparatus as well as account information, data storage, error checking, and other functions as will be explained hereinafter.

A real-time clock contained within the circuitry is under control of the microprocessor synchronized to remote signals incoming from a transmitter station in order to synchronize the clock within an overall paging system. The clock is arranged to maintain the pager in a standby or idle mode during large periods of time, and activates the system into a receiving mode for only short selected periods within a preassigned time frame. During the receiving mode, it is available for receiving paging signals and the microprocessor can select those which are addressed to any of its prestored telephone numbers or identification numbers. Through the use of such real-time clock synchronization technique, the longevity of the battery power source can be extended. This, coupled with the use of low power circuitry, extends the lifetime of the battery unit.

The circuitry includes in addition to the receiver and other components required for paging operation, unique audio and visual circuitry which can be both manually as well as remotely controlled. The paging apparatus can provide a unique audio sound for its particular paging apparatus which sound differs from substantially all other paging apparatus within a unified paging system. In addition, it can provide various paging signals based upon the type of incoming message received. By way of example, a unique sound can be provided for an incoming emergency call. The audio can be controlled to commence at a low or hushed sound and provide an increasing sound until switched off or until a given maximum volume. It can also be arranged to provide a frequency chirped type of signal, thereby being non-directional. The control can be either by varying pitches or varying volumes, or combinations thereof.

The visual indicators provide indications of incoming messages, as well as whether messages are being stored, and also indications of types of messages that have either been received within the microprocessor and being stored, or which are being stored at a central transmission station in communication with the pager apparatus.

The foregoing described circuitry is packaged within a thin, flat type of packaging to provide a size which is unusually thin, and by way of example, approximately one-tenth of an inch thick. Such thin size is achieved by utilizing a sheet battery with thin planar circuitry coupled to the battery. A stripline antenna is preferably utilized to maintain the maximum receiving capabilities within the overall desire of a thin size.

Through the utilization of thin packaging, the pager apparatus can also include account identification information in the form of a magnetic strip, raised letters or numbers, and the like, thereby permitting utilization of the pager apparatus as a credit card, calling card, telephone card, or the like.

Utilization of the paging apparatus as a credit card, or the like, can find an integration of physical and functional aspects. By way of example, in a typical paging system, a caller must call into a central station and thereafter insert the phone number of the called party. In the present invention, the telephone of the central station can be included on the magnetic strip, or other account identification information placed on the pager. In this manner, the pager can be used both to receive calls within a paging system as well as the device for calling other pagers within the paging system.

The magnetic strip, or the like, can also include the telephone number of the called party or other account identification information relating to his account number, and can also include information with respect to the active nature of the account and verification information concerning his account. Additionally, the microprocessor which is utilized within the paging apparatus can likewise be utilized to maintain account information with respect to the account of the called party.

The circuitry operates in accordance with a protocol according to which the apparatus is designed. By way of example, the protocol can include responses to local or global options. Global refers to the ability to address all pagers in a given system simultaneously. Local refers to addressing less than all the pagers. Also the circuitry permits responses to messages addressed to multiple pager apparatus, so long as the particular identification number of this apparatus is included within the address. The date and time of information can automatically be indicated upon receipt of each message. Other protocol instructions can likewise be assigned.

As a result of the aforedescribed circuitry, packaging, and other functional aspects, it is possible to achieve a pager apparatus which can serve as a credit card and has a thin size and low cost and low power requirements. Such a paging apparatus can then be carried by each individual. Because of its low cost and long life capability, the device can actually be made in a disposable manner. Alternately, an arrangement can be made to recharge the battery for continued reusage.

Hereinafter, in order to facilitate understanding of the invention, the use of the terminology "account identification information" will be utilized to cover various types of information included on either a credit card, a telephone card, a calling card, or the like. Similarly, the term "credit card" is used generically to include credit cards, calling cards, telephone cards, and the like.

BRIEF DESCRIPTION OF THE DRAWINGS

The novel features of the invention are set forth in the appended claims. The invention itself, together with any other objects and advantages thereof, may be better understood by reference to the following description taken in connection with the accompanying drawings in which:

FIGS. 4a, 4b and 4c show respectively an open front view, side view and edge view of a second embodiment of the invention that includes a rotatable, hingeable flap, while

DETAILED DESCRIPTION OF THE INVENTION

Referring now to FIGS. 1a, 1b, 1c, and 1d, one embodiment of the invention is shown as a planar pager receiver 10, having a length l and a width w conforming generally to the length ; and width of a conventional credit card, namely a length of about three and one-half inches and a width of about two and one-fourth inches. The thickness of the receiver is generally less than three-sixteenths of an inch and preferably about one-tenth of an inch. It should be appreciated that the thickness is somewhat dependent on the size of the battery. The pager includes a front face 12 and a rear face 14. These surfaces may conveniently be plasticized to give the appearance of regular credit cards.

On the front surface 12 is a display 16 which may include the name of the called party and any paging, credit card or telephone calling card account identification numbers. To the extent possible and convenient, the same identification numbers may preferably be used for these different identification purposes.

A magnetic strip 18 is shown mounted across the back surface 14, upon which may be included the name, account numbers or any other identification or verification information, such as expiration dates and credit limits of the accounts of the called party. As is well known, this magnetic strip may be used by merchants to activate a magnetic card reader when the bottom of the card is passed through the reader. The card reader transmits the data on the card by telephone to a central office which can immediately verify the account and credit status for the merchant. This magnetic strip 18 thus enables the pager receiver 10 to also function as an account identification card.

The magnetic strip could also contain the telephone number of the paging system central station. Thus the card could be used as a calling card or telephone card. The card is slipped into a telephone card reader to automatically dial a central station of a paging system. The telephone number of the pager to be called is then dialed onto the phone to page another party. The magnetic strip could also include the billing number to be billed for the call. Thus, the apparatus of FIGS. 1a, 1b, 1c and 1d is used as a calling card to call other pagers and a pager receiver to receive pages from others.

It should be appreciated that in place of the magnetic strip, other account identification information storing indicia could be used, such as embossed alphanumeric characters, bar codes, etc.

Mounted within the card is a thin flat battery 20. Battery 20 may be one of a plurality of presently available flat thin flexible batteries, including a lithium sheet battery, or a battery that uses a solid polymer electrolyte as the ionic conducting medium, or a solid state battery that uses lithium anodes, solid cathodes and a solid polymer electrolyte that both separates and provides the ionic pathway between the anodes and cathodes. One suitable battery is a newly developed solid state battery described in an article entitled "Flat Polymer Electrolytes Promise Thin-Film Power" by M. Z. A. Munshi and B. B. Owens published in the August 1989 issue of the IEEE Spectrum. This battery is more energy dense than a liquid electrolyte battery and is capable of combining high energy density with mechanical ruggedness for a variety of applications.

The pager apparatus 10, shown in FIGS. 1a, 1b, 1c and 1d also contains a liquid crystal display 22 on one side 12. A "Display Message" switch 26 and an "Audio" switch 28 are available for actuation from the front of receiver 10. Also visible from the front of receiver 10 are six indicator lights, namely, a light 30 for indicating a low battery, a light 32 for indicating receipt of a new message, a light 34 for indicating receipt of a voice message, a light 36 for indicating that the audio transducer is off, an out of range indicator 27 and an echo indicator 29. Although the switches and displays were shown in particular locations, it should be appreciated that these could be relocated elsewhere on the apparatus for convenience.

Figure 2:
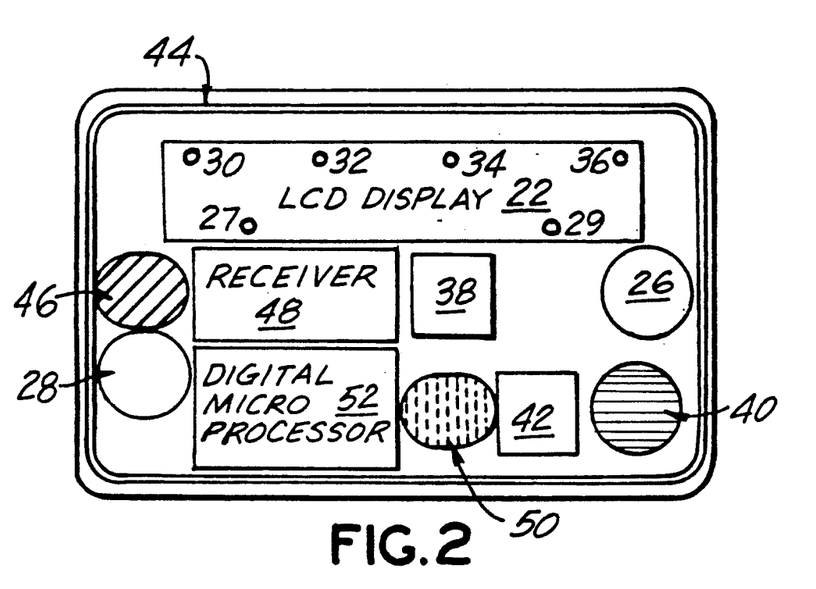
FIG. 2 shows a planar view of the inside of the pager receiver with a functional block description of its major components.

Referring now to FIG. 2, there is shown a preferred layout of the active components of the pager 10. As previously described, these components include a liquid crystal display (LCD) 22, and indicator lights 27, 29, 30, 32, 34, and 36 as well as the Message Display switch 26 and the Audio switch 28 actuable from the front of the receiver 10. In addition there is a real-time clock 38, an audio transducer 40 and an audio circuit 42 located adjacent the Audio switch 28 as well as electronic signal receiving and processing means including a loop antenna 44 around the rim of the pager 10, an impedance matching network 46, a receiver 48, a buffer amplifier 50 and a digital microprocessor 52. The loop antenna 44 is preferably a stripline antenna. All these electronic components are preferably mounted in a planar manner without individual packaging. With such construction, it has been found possible to produce a pager receiver 10 in accord with the invention whose external dimensions are approximately those of a standard credit card.

The liquid crystal display 22 is capable of generating alpha-numeric characters for displaying the paging information as well as the date and time a message is received. This LCD 22 as well as the indicating lights 27, 29, 30, 32, 34 and 36 and the audio alarm means 40 and 42 are connected to be actuated by the output of the transmitted signal receiving and processing means comprising antenna 44, impedance matching network 46, receiver 48, buffer 50 and digital microprocessor 52.

The "New Message" light 32 is turned on whenever a new message is received, but only the last message received is displayed on the LCD 22. Further messages are stored while the current message is being viewed. The "New Message" light 32 remains turned on until the last of the stored messages is viewed, but all succeeding messages are displayed only when the "Display Message" switch 26 is activated. There can also be provided an "Out of Range" indicator 27 which indicates that the pager is out of range of the transmitted signal. Additionally, there is shown on "Echo Indicator" 29 which provides an indication on the pager that the message sent out by the pager holder to another pager was actually transmitted to the other pager. The actual message transmitted to the other pager can also be received by the pager of the calling party, as will hereinafter be explained.

The signals from a remote transmitter in the paging system can, as is well known, be coded to indicate the type of message being transmitted, i.e. whether it is a type of message to be displayed on the LCD or whether it is a "voice" message that has been stored in a voice mail box at the transmitting central station, or both. If it is such a "voice" message, the pager receiver is programmed to turn on the "Voice Message" light 34. The pager receiver holder can then contact his voice mail box at the central station, and once the voice message is retrieved, the indicator light 34 can be automatically turned off by a "turn-off" signal from the central station. If the voice message is not retrieved, the central station may turn off the indicator light 34 after a predetermined interval of time.

The electronic components of the invention are all generally available or easily manufacturable preferably as integrated circuits. Receiver 10 may be a SIGNETICS NE605, manufactured by the Signetics Corp. of Sunnyvale, Calif., that demodulates and amplifies incoming data and provides the logic circuitry with a stream of digital signals. Under current FCC regulations three frequency windows for paging are allowed:

at approximately 150 MHZ, 450 MHZ and 900 MHZ. Whereas, at lower frequencies a receiver design is simpler, of lower cost and of reduced power consumption, it is known to those familiar with the art that, at higher frequencies, there is less congestion and higher antenna efficiency for a credit card size antenna. It would seem preferable, bandwidth permitting, to use wideband FM modulation for better signal to noise performance. Bandwidth considerations, however, may alternatively require the use of AM or narrow band FM modulation.

Microprocessor 52 may be an INTEL 87C51, manufactured by Intel Corp., of Santa Clara, Calif., and be used in conjunction with a real-time clock 38 such as an INTERSIL ICM7170, manufactured by Intersil Corp., of Cupertino, Calif., that activates and deactivates all the circuitry on the pager at regular intervals. It should be noted that a custom made digital circuit could be designed instead of using the microprocessor. Clock 38 is synchronized to the transmitting station that regularly transmits timing information. The transmitter continuously polls its internal data base to determine which pager devices are programmed to be on for a particular time slot, and transmits the appropriate information to those devices. Microprocessor 52 contains, additionally, decision making circuitry to determine when to turn on audio circuit 42, audio transducer 40 and display 22. It is evident to those familiar with the art that each message should be transmitted a plurality of times to avoid the possible loss of a message. Concurrently, the logic must also detect multiple transmissions of the same message. This is achieved by having the receiver compare each incoming message with the last message stored. If both are the same, the paging apparatus assumes that the latest message is only a retransmission of the previous one and, therefore, ignores it. If the caller wishes to retransmit the same message, the central transmitting station sends first a blank or dummy call intended to clear the last message from memory. Only then, it will retransmit the message a second time. It is evident to those familiar with the art, that such a procedure is instrumental in avoiding confusion in the event of multiple transmissions of the same message.

The microprocessor 52 contains, additionally, a plurality of memory locations to store previous messages and means for checking the integrity and content of those messages.

The microprocessor 52, in accordance with the invention, is programmed to rearrange paging data for display in order of importance, in accordance with some predefined criterion determined by the pager holder. Thus it is possible to display all messages of a given source and hold off the display of others for later retrieval and viewing.

The audio circuit 42 and associated audio transducer 40 generate an audio signal when the pager device decodes an incoming signal. This call sound is only exercised when the audio transducer switch is on. Under emergency conditions, the audio transducer generates a high pitch sound even when the audio transducer switch is turned off. Audio transducer has, additionally, means for emitting audio signals of different pitches and volumes to distinguish one pager from another so that each pager has a unique sound among a large group of pagers. It is also possible that the paging apparatus can have its audio signals gradually increase in volume in predetermined increments to attract the attention of the pager holder first before anyone else in the vicinity of the holder will hear the paging signal. The holder can then proceed to switch the audio transducer off.

Additionally, the pager holder has the option of identifying the source and nature of an incoming message by sound. This is achieved by assigning a different pitch (e.g., audio frequency) to each category of messages. There can also be provided a plurality of sounds capable of emission from the pager, each of a different pitch and/or volume. The sequence of emitting each of these sounds can be varied depending on the type of paging signal received. This option can be programmed in the microprocessor and made part of the protocol. Thus, an incoming message contains an identification number which, when decoded by the microprocessor, activates audio circuit 42 that prompts audio transducer 40 to emit the specified audio response.

Preferably, the audio transducer frequency is also designed to generate non-directional sounds. Means exist for turning off the audio transducer 40 of all or a selected group of pager devices, preferably, by means of a special code. It is intended that this feature be used in public places where audio signals are undesirable and a localized transmitter can be used to disable all audio transducers in its immediate vicinity. Since the calling card pager will be carried by many people, in a theater or lecture, a local transmitter can emit an encoded signal which will be picked up by all the pagers within the proximity of the auditorium and simultaneously turn them all off. Additionally, it is intended for the central transmitting station to override any and all of the audio and/or visual features herein described, including emergency calls.

Referring now to the operation of the paging device, the digital data AM or FM modulated on a 150, 450 or 900 MHz carrier, is picked up by the stripline antenna 44. An impedance matching network 46, which also serves as a bandpass filter, forwards the signal from the antenna 44 to the RF amplifier section of the receiver 48. Part of the receiver 48 is an RF oscillator stabilized by an external crystal. The oscillator output and the preamplified signal are multiplied in the mixer section of the receiver circuit 48, thus creating an intermediate frequency (IF), preferably, 10.7 MHZ. The IF section of the receiver 48 is comprised of a chain of high gain amplifiers and one or plural external, preferably ceramic, bandpass filters. The amplified signal is then demodulated in the final section of the receiver, thus providing digital data as the final output of receiver 48. The output signal of receiver 48 is then passed through either a buffer 50 or a single transition amplifier to ensure that the data conforms with the required logic levels. Typical voltage levels for CMOS circuits are 3 volts for High and ground for Low.

It is evident to those familiar with the art that, for the sake of simplicity, a byte oriented UART (Universal Asynchronous Receive and Transmit) protocol, shown in FIG. 3, may advantageously be used in the embodiment of the invention. Alternatively, a protocol requiring less bandwidth could also be used.

Figure 3A:
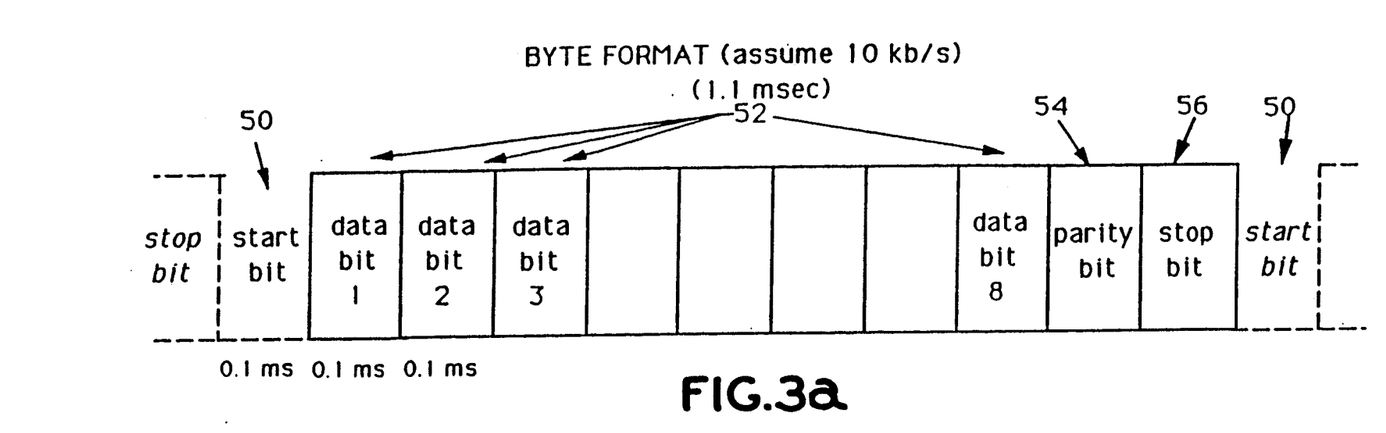
FIGS. 3a and 3b are diagrams showing examples of signal trains used in the invention.

Microprocessor 52 contains additionally a UART receiver (not shown) with programmable bit rate. The receiver contained therein assembles the serial data input, strips the start and stop bits, checks the parity and places the 8-bit byte in an internal buffer every 1.1 millisecond for a 10 kilobit/second data rate, as shown in FIG. 3a.

The main processor of the microprocessor 52 transfers the byte from the receiver buffer to its internal registers during the time the receiver assembles the next byte, and simultaneously performs various operations on it, depending on the position of the byte that is received within the data stream.

Figure 3B:
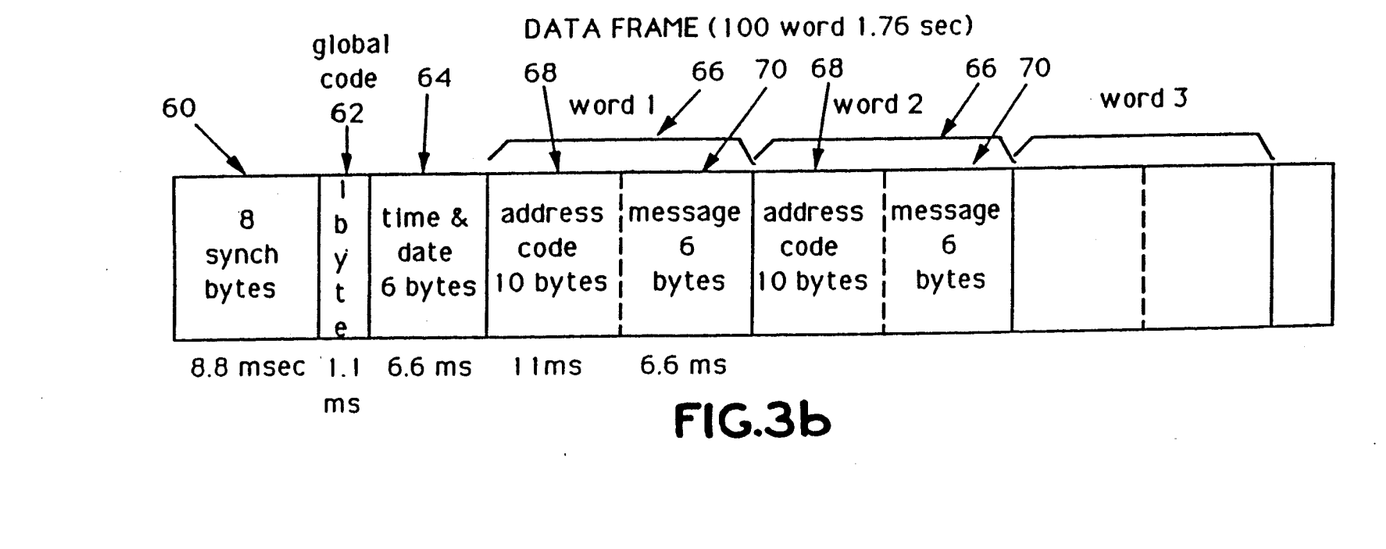

Referring now to FIG. 3b showing the data frame, the processor is initially activated by the real-time clock alarm signal and will, at a predetermined time, turn the receiver on. It then waits for the detection of synchronization bytes 60 that mark the beginning of the frame. These bytes define a unique sequence that cannot be matched by messages accidentally. The synchronization data sequence is programmed in an internal or external Read-Only-Memory (ROM) (not shown) to be compared with the incoming data. Once synchronization with the data stream transmitted by the central station has been established, the pager checks for the presence of a global code 62 which would be used by the central station to address all pagers in the system at once. Thereafter, the date and time 64 are recorded. This information is used to synchronize the resident real-time clock to the central station to avoid long term clock drifts. The alarm clock is also set to activate the processor after a predetermined time interval. Upon completion of the aforementioned housekeeping chores, the processor checks the data stream that was received until it detects one of its programmed address codes or until it reaches the end of the frame. If no address code is received by then, it implies by default that no message was ever intended for this pager apparatus during this time slot and no further processing is required by the processor. In the absence of a message, the processor turns the RF receiver off and instructs the real-time clock 38 (FIG. 2) to switch into a low power standby mode. Finally, the processor puts itself into an idle mode until arrival of the next "wake up" signal.

It should thus be appreciated, that the microprocessor is preassigned a plurality of telephone numbers or identification numbers to which it can respond. These may typically be the called party's home number, his business number, or any other number that he desires to be reached at. It will also respond to group signals. For example, all employees within a particular company can have a common identification number so that the owner of a company can reach all of the employees with a single paging signal. It will also respond to emergency calls of both the local emergency type and group emergency type. Likewise, it will respond to an auditorium cut off signal so that in a concert, theatre, or the like, a local transmitter can emit a unique signal to all pagers within the area and each will respond to this code by disabling the audio transducer and/or other indicator means. The identification number can include suffixes so that a single number can be used for a family with individual suffixes for each member of the family.

The apparatus also includes a real-time clock which operates under control of the microprocessor to turn on the apparatus into a receive mode for short intervals of time and then turn it back off into a standby mode of operation for greater duration of time. For example, the receive time may be three seconds, and the standby time may be five minutes. These times can, of course, be varied. During the standby time, only low power consumption is needed. Even during the receive mode, the amount of power used is rather low. This is achieved through the use of low power circuitry. As a result, with the type of batteries previously described, and with the standby mode of operation and low power circuitry, the battery can be long lasting, and they typically last as long as a year, or more, depending upon the technology of battery being utilized.

When the clock turns the apparatus into its receive mode of operation, it will be capable of receiving paging signals transmitted from a remote location, typically the central station. The central station transmits the messages intended for the selected pagers that are designated to be turned on during that time interval, typically during the three seconds previously mentioned. After establishing data communication, there will initially be a synchronization signal to synchronize the local clock with the clock in the central station to make sure that there is no time drift. Thereafter, the central station will send out the paging signals that are addressed to all paging apparatus that should be turned on during that same three-second interval. Each paging signal will include an initial address or identification number of the particular pager being addressed. Thereafter, it will be followed by the particular message that it wishes to transmit to that paging apparatus.

The receiver in the paging apparatus receives all of the signals during this three-second interval. The microprocessor will initially check the data stream synchronization and then the presence of a global code. Then it will operate upon the synchronizing signal to synchronize the real-time clock in the paging apparatus. Thereafter, it will compare the identification numbers of the paging signals received to see if any of them correspond to the identification numbers being assigned to this paging apparatus. Upon achieving a comparison, it will then accept the message assigned to this paging apparatus. It will then command the audio and visual indicators to emit a specified response in accordance with the particular message being received. For example, emergency messages may have a particular type of response while normal messages may have another type of response.

When using the echo indicator, as the transmitter sends out the message to the called party it will also send the same message to the calling party. Thus the pager of the calling party will respond and indicate that the message was sent and will actually store the message sent.

Referring now back to FIG. 2, if the pager identifies its own or some other pre-programmed code (e.g., an emergency code), it then records the subsequent n bytes as the intended message. "New message" indicator 32 flashes on the LCD display 22 for a predetermined interval of time and then remains lit. The message is subsequently downloaded to the built-in memory servicing the LCD display 22.

Depressing the pushbutton switch 26 marked "Display Message" results in the display of an alphanumeric message along with the date and the time of receipt. Completion of this operation automatically turns the new message indicator off. If a previous message not yet viewed was erased by the new message being displayed, the "new message" indicator light 32 remains lit for a predetermined duration or until the pager holder calls the transmitting station to retrieve his message after which the central station will clear the "new message" indicator. For conservation of energy considerations, LCD display 22 turns itself off after some interval of time. The holder may retrieve stored messages by depressing "Display Message" switch 26.

It is evident to those skilled in the art that a custom chip can be designed to perform all the aforementioned logic operations and replace one or several circuit components herein described.

According to the present invention, reception of a message prompts the processor to activate audio oscillator circuit 42 when audio switch 28 is turned on. The audio oscillator circuit 42 drives audio transducer 40 that emits an audible sound to alert the pager holder of an incoming message. Each paging device emits a different sequence of tones to help the holder of the pager distinguish his from all other pagers. Accordingly, the frequency is chirped to generate a non-directional signal to avoid discomfort to the holder of the pager by attracting attention. The audio volume is, preferably, set to increase gradually until it captures the attention of the pager holder, at which time the "audio" switch is turned off. The audio feature is activated and deactivated, either manually, by means of "audio" switch 28 or, externally, by means of radio waves. The pager device remains fully operational even when the audio transducer 40 is turned off. The "audio off" indicator 36 is lit under this condition to tell the pager holder not to expect any audio signals. The audio feature may be reinstated at any time by activating "audio" switch 28. Completion of the aforementioned tasks prompts the pager device to turn itself off until the next "wake up" signal.

Referring now back to FIG. 3a, as previously mentioned, a UART protocol is used to format the stream of data. This protocol is a byte oriented ASCII protocol, well known to those familiar with the art. In the preferred embodiment, where only unidirectional transmission is required, the need for the transmit function becomes unnecessary. Bits within the UART protocol are non-return-to-zero (NRZ) which restricts having any space in between two adjacent highs or two adjacent "logic 1's." The beginning of a byte is indicated by a start bit 54, characterized by its high-to-low transition. The circuit samples the low bit to determine the phase of the data stream, namely, its position in time. The start bit 54 is then followed by eight data bits 55, which constitute a byte, by an optional parity bit 56 and, finally, by a stop bit 57. A parity bit is used for error detection, whereas a stop bit indicates the end of the byte. It is known to those familiar with the art of formatting and transmitting data, that additional error detection or error detection and correction features could be added. In instance where sensitive information is to be transmitted, Hamming-code based error correction would be preferable. Since it is of utmost importance in the present invention to avoid false alarms, the address portion of the message will be encoded. As means of illustration, a data rate of 10Kbits/sec corresponds to a 0.1 millisecond pulse width, for a total byte length of 1.1 milliseconds.

The bytes are assembled to form a data stream at the transmitting end and are beamed after modulation. A typical data frame is illustrated in FIG. 3b. The frame begins with, preferably, eight synchronization bytes. These bytes contain bit sequences that cannot be mistaken for data messages, thus allowing the microprocessor to determine the beginning of the frame. The frame format is programmed in microprocessor 52 to permit the pager apparatus to properly interpret all subsequent fields.

The first byte following synchronization is a "global code" byte 62. It determines the format of all remaining bytes within the frame. Additionally, it also signals to all the active pagers at that time, to follow various instructions before the messages are transmitted. Following are examples that illustrate the nature of the aforementioned commands:

turn on audio transducers for incoming emergency information;
enable or disable audio transducers;
enable or disable visual indicator;
reprogram pagers;
override audio-off switch;
clear all "new message" indicators; and
clear all "voice message" indicators.

In a standard frame format, the first plural bytes correspond to, preferably, the Hamming-coded date and time that set the real-time clock in the pager apparatus. The remainder bytes in the standard frame are partitioned into words. It is to be recognized that the optimum number of words is determined by a trade-off between minimizing the length of the frame and maintaining the overhead (i.e., synchronization bytes, date and time, ...) a small percentage of the total information. Likewise, there is a tradeoff in that a short frame length allows for a short "on time," which in turn, conserves power. However, this reduces the number of messages that can be sent during a frame and therefore increases the queuing time, or possible waiting time, until a particular pager gets a message.

Following the date and time bytes, a plurality of words 66 appear, each word divided into two fields: an address code 68 and a message 70. The address code 68 corresponds to the address of the paged apparatus. It is compared to the internal addresses coded within the pager to determine whether the correct pager is being addressed. The particular pager apparatus that is singled out decodes the message transmitted and displays its content on the LCD display 22.

Additional bits in the message field, according to the present invention, are reserved for a "local code" that serves a similar purpose to that of a "global code" 62, except that the "local code" only affects individual pagers that are addressed. For example, it can signal a personal emergency or it can activate or deactivate the audio transducer, or reprogram receivers, or clear indicators, etc.

Each pager can be encoded with a plurality of codes, such that the received address codes are compared to all existing addresses within the pager until an appropriate match is found.

It is thus possible to have a particular group of pager holders adopting a common code to allow each member of the group to be simultaneously addressed. It is to be recognized that these coded numbers can be reprogrammed at will. It is therefore advantageous to assign more than one identification number to each pager, some of which may be shared by other pagers. A pager holder may wish, for instance, to use the same apparatus to receive messages of various sources (e.g., his home and office), each to be distinguished by a distinct frequency and amplitude.

An identification number can be further extended by adding suffixes, one for each member of a sub-group or family. Thus, it is possible to reach all the members of a group with one number or, alternatively, only a selected subset of that group.

Figure 1:
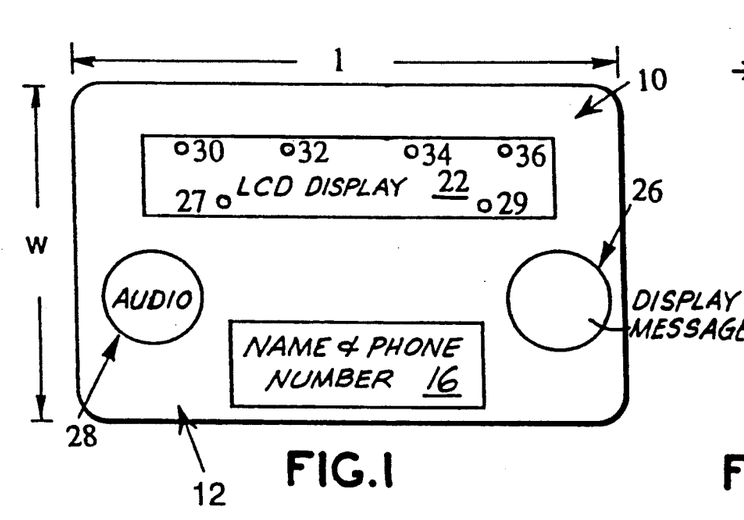
FIGS. 1a, 1b, 1c and 1d show respectively a front planar view, side view, edge view, and a back view of one embodiment of the pager receiver of the invention.
Figure 1A:
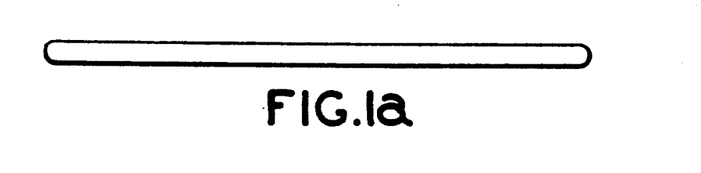
Figure 1B:
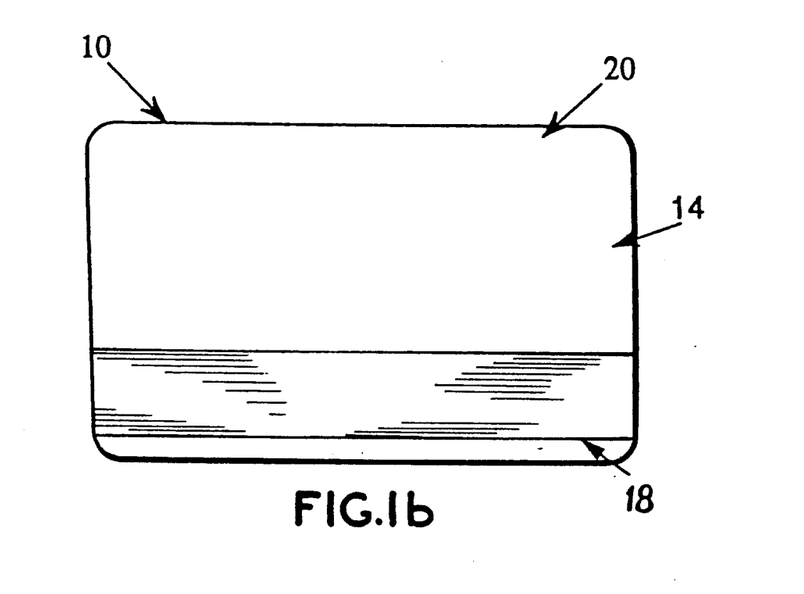
Figure 1C:
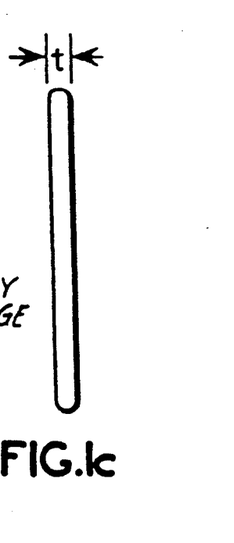
Figure 4A:
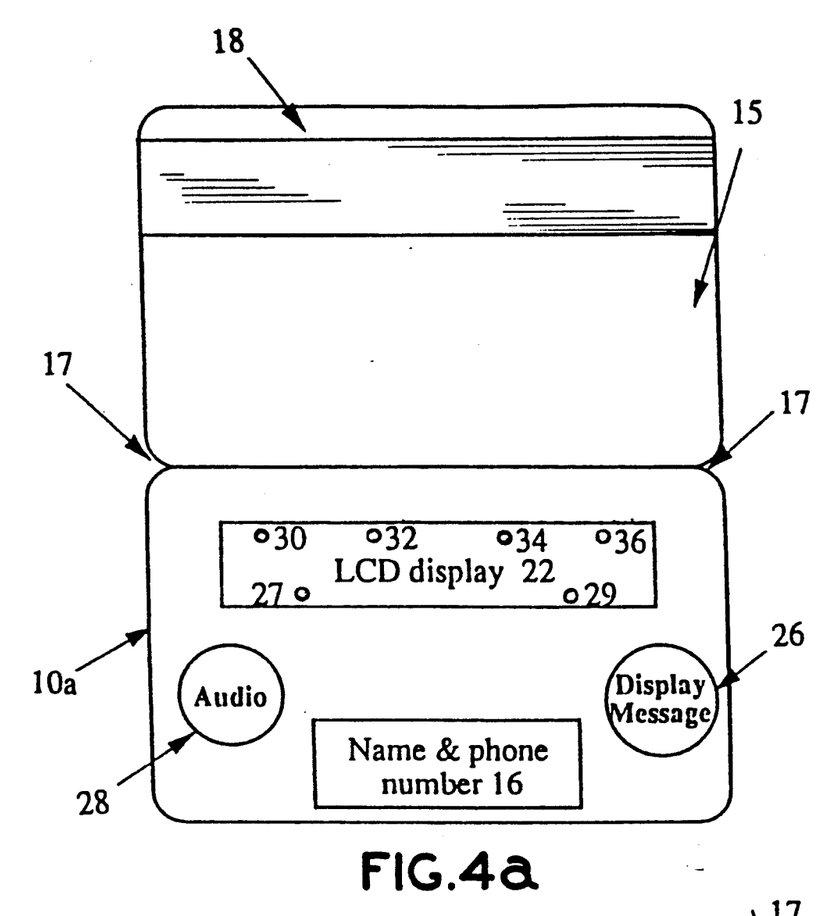
Figures 4B, 4C:
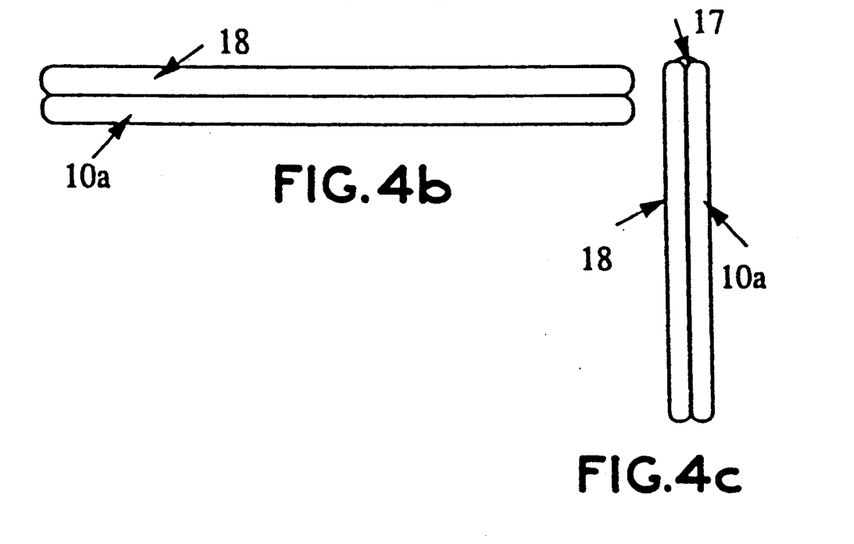

Referring now to FIGS. 4a, 4b and 4c, there is shown another embodiment of the invention in the form of a pager apparatus 10a similar to the pager 10 of FIGS. 1

& 2 but with an additional flap portion 15 hinged at 17 to the top of pager 10a and rotatable to a position covering the front thereof. In this embodiment, the magnetic strip 18 can be located on this flap portion 15 instead of on the pager 10 of FIGS. 1 & 2. When folded over the front of pager 10a, this flap portion also protects this magnetic strip 18 and also protects the front displays 16 and 22 and switches 26 and 28. The flap portion 15 may also have a thickness precisely equal to a standard credit card, and allows the pager receiver to conform to ANSI credit card standards.

Figures 5A, 5C:
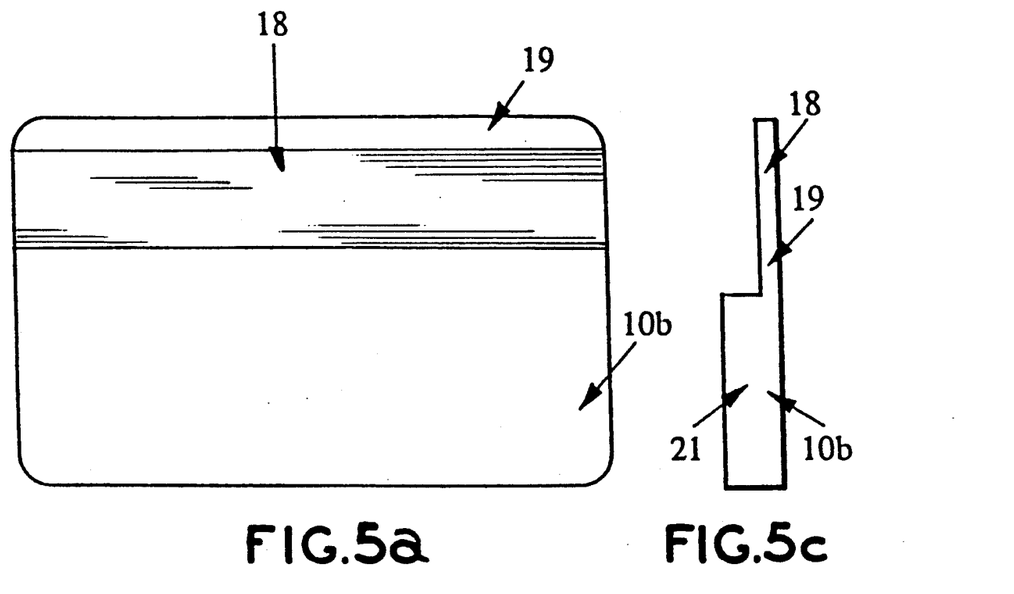
FIGS. 5a, 5b and 5c show respectively a back view, side view and edge view of a third embodiment of the invention wherein an upper portion of the pager receiver is thinned out to conform to the thickness of a credit card.
Figure 5B:
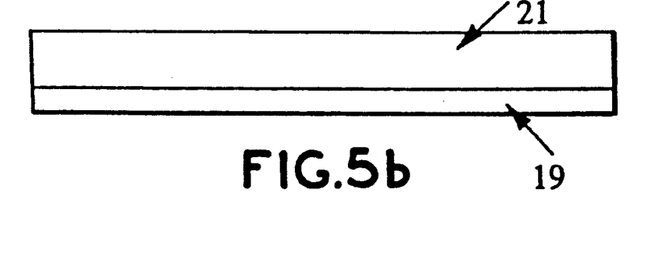

Referring now to FIGS. 5a, 5b and 5c, there is shown yet another embodiment of the invention in which the magnetic strip 18 is located on the back surface of a portion 19 of a pager receiver 10b that is thinned out to conform to the thickness of a standard credit card, thereby to facilitate insertion in a credit card validation apparatus. In this embodiment, the battery and all the remaining components of this pager 10b, with the possible exception of the LCD, are located in the thicker lower portion 21 of the pager receiver 10.

While only certain embodiments of the invention have been described herein, it will be apparent to those skilled in the art that various changes and modifications may be made without departing from the spirit and scope of the claimed invention.

I claim:

1. A disposable credit card pager apparatus, comprising:

paging circuit means, indicator means coupled to said paging circuit means, said paging circuit means receiving paging signals directed to it from a remote transmitter location and in response thereto activating said indicator means to the holder of the apparatus;

housing means in the shape and size of a credit card and constructed for utilization in a standard credit card reader;

account identification means containing account identification information and located on said housing means for credit card usage in a standard credit card reader by the holder of the apparatus;

processing means in said housing means associated with the account identification means for processing information received from the paging signals;

a thin flat battery in said housing means, said indicator means, said paging circuit means and said processing means being integrated with as well as energized by said thin flat battery, and wherein said housing means comprises a hingeable flap portion thinner than the rest of said housing means, said account identification information being on said thinner flap portion to thereby permit the hingeable flap portion to conform to ANSI credit card standards.

2. A disposable credit card pager apparatus as in claim 1, wherein said account identification means includes a magnetic strip on the exterior of the housing means.

3. A disposable credit card pager apparatus as in claim 1, wherein said account identification means includes embossed alphanumeric characters on the exterior of the housing means.

4. A disposable credit card pager apparatus as in claim 1, wherein the account identification information includes the telephone number of the remote transmitter, said telephone number being in machine readable form.

5. A disposable credit card pager apparatus as in claim 1, wherein the processing means includes means for storing at least one identification number identifying the pager apparatus, and wherein said account identification information includes said at least one identification number in machine readable form.

6. A disposable credit card pager apparatus as in claim 1, wherein said processing means includes means for storing said account identification information and wherein said account identification information comprises at least one identification number identifying the pager apparatus, and wherein said processing means further includes means for validating said at least one identification number.

7. A disposable credit card pager apparatus as in claim 1, wherein said flap portion is sufficiently thin for utilization in standard credit card readers.

8. A disposable credit card pager as in claim 1, wherein said battery is a lithium battery.

9. A disposable credit card pager as in claim 1, wherein said battery comprises a solid polymer electrolyte means as an ionic conducting means.

10. A disposable credit card pager as in claim 1, wherein each paging signal includes pager identification information, and wherein said processing means comprises means for selecting any of a plurality of pager identification information received and causing a specified alerting indication corresponding to each selected paging signal.

11. A disposable credit card pager as in claim 10, wherein at least one of the plurality of pager identification information is included within the account identification information.

12. A disposable credit card pager apparatus as in claim 1, wherein said processing means comprises a microprocessor means having stored therein a plurality of identification numbers, means for comparing an identification number contained within a received paging signal with the stored identification number, means responsive to achieving a comparison for determining the type of indication to be provided by said indicator means resulting from the comparison achieved, and means for signalling the indicator means to provide the type of indication determined.

13. A disposable credit card pager apparatus as in claim 1, wherein said circuit means is a low power consumption circuit, and wherein said processing means comprises means for controlling said low power consumption circuit into a standby mode of operation and a fully energized receiving mode of operation, and further comprising clock means for providing periodic signals for switching between said standby mode and said receiving mode.

14. A disposable credit card pager apparatus as in claim 13, wherein said receiving mode is of substantially shorter duration than said standby mode.

15. A credit card pager apparatus as in claim 14, wherein said battery is sufficiently long lasting, and said circuit is of sufficiently low cost, to permit the disposability of said apparatus.

16. A credit card pager apparatus as in claim 1, wherein said processing means verifies information regarding said account identification information.

17. A disposable credit card pager apparatus as in claim 1, wherein said battery is non-rechargeable, and non-replaceable by the user.

18. A disposable credit card pager apparatus, comprising:

paging circuit means, indicator means coupled to said paging circuit means, said paging circuit means receiving paging signals directed to it from a remote transmitter location and in response thereto activating said indicator means to the holder of the apparatus;

housing means in the shape and size of a credit card and constructed for utilization in a standard credit card reader;

account identification means containing account identification information and located on said housing means for credit card usage in a standard credit card reader by the holder of the apparatus;

processing means in said housing means associated with the account identification means for processing information received from the paging signals;

a thin flat battery in said housing means, said indicator means, said paging circuit means and said processing means being integrated with as well as energized by said thin flat battery, and wherein said housing means contains a first portion and a second portion, said first portion being thinner than said second portion, said account identification information being on said second to permit usage in an ANSI reader.

19. A disposable credit card pager apparatus as in claim 18, wherein said account identification means includes a magnetic strip on the exterior of the housing means.

20. A disposable card pager apparatus as in claim 18, wherein said account identification means includes embossed alphanumeric characters on the exterior of the housing means.

21. A disposable credit card pager apparatus as in claim 18, wherein the account identification information includes the telephone number of the remote transmitter, said telephone number being in machine readable form.

22. A disposable credit card pager apparatus as in claim 18, wherein the processing means includes means for storing at least one identification number identifying the pager apparatus, and wherein said account identification information includes said at least one identification number in machine readable form.

23. A disposable credit card pager apparatus as in claim 18, wherein said processing means includes means for storing as said account identification information and wherein said amount identification information comprises at least one identification number identifying the pager apparatus, and wherein said processing means further includes means for validating said at least one identification number.

24. A disposable credit card pager as in claim 18, wherein said battery is a lithium battery.

25. A disposable credit card pager as in claim 18, wherein said battery comprises a solid polymer electrolyte means as an ionic conducting means.

26. A disposable credit card pager as in claim 18, wherein each paging signal includes pager identification information, and wherein said processing means comprises means for selecting any of a plurality of pager identification information received and causing a specified alerting indication corresponding to each selected paging signal.

27. A disposable credit card pager as in claim 26, wherein at least one of the plurality of pager identification information is included within the account identification information.

28. A disposable credit card pager apparatus as in claim 18, wherein said processing means comprises a microprocessor means having stored therein a plurality of identification numbers, means for comparing an identification number contained within a received paging signal with the stored identification number, means responsive to achieving a comparison for determining the type of indication to be provided by said indicator means resulting from the comparison achieved, and means for signalling the indicator means to provide the type of indication determined.

29. A disposable credit card pager apparatus as in claim 18, wherein said circuit means is a low power consumption circuit, and wherein said processing means comprises means for controlling said low power consumption circuit into a standby mode of operation and a fully energized receiving mode of operation, and further comprising clock means for providing periodic signals for switching between said standby mode and said receiving mode.

30. A disposable credit card pager apparatus as in claim 29, wherein said receiving mode is of substantially shorter duration than said standby mode.

31. A disposable credit card pager apparatus as in claim 30, wherein said battery is sufficiently long lasting, and said circuit is of sufficiently low cost, to permit the disposability of said apparatus.

32. A disposable credit card pager apparatus as in claim 18, wherein said processing means verifies information regarding said account identification information.

33. A disposable credit card pager apparatus as in claim 18, wherein said battery is non-rechargeable, and non-replaceable by the user.

* * * * *